: 3,066,108
Patented Nov. 27, 1962

3,066,108
AIR-DRY SURFACE COATING RESIN
Ronald L. Broadhead, Park Forest, Ill., assignor to Standard Oil Company, Chicago, Ill., a corporation of Indiana
No Drawing. Filed Apr. 28, 1960, Ser. No. 25,225
12 Claims. (Cl. 260—22)

This invention relates to resins of the polyester condensation reaction type and particularly resins which are suitable for the formation of an air-dry surface coating film, and preferably, resins which have substantial solubility in water.

Resins have been used for a long time in the production of surface coating films. The so-called alkyd resins which are extensively used for production of surface coatings possess reasonable air-dry properties at ordinary atmospheric temperatures. (The term air-dry means the ability of the resin to form a rigid solid film when exposed to the atmosphere at ordinary temperatures, particularly 50°–100° F.) These alkyd resins are soluble in hydrocarbon solvents.

Extensive efforts have been made to produce materials suitable for surface coating application which materials can use water as the vehicle. At present, air-dry surface coatings are producible only by the use of true emulsions or latex emulsions when water is the vehicle. For reasons of flexibility in formulation and storage stability, a truly water soluble surface coating system is of very great interest to the paint industry.

An air-dry, water-soluble resin based on trimellitic anhydride has been developed; however, the viscosity of paint made from these resins is, at "typical" solids content, high enough to interfere with application on a surface. This viscosity is easily reduced to the proper level by adding more water; this decreases the solids content per volume—an undesirable feature in an industry oriented to operation on a gallon of paint basis.

A resin suitable for the formation of an air-dry surface coating film has been discovered which resin is soluble in the ordinary hydrocarbon solvents and oxygenated organic solvents now used in the paint industry and is also capable of forming very stable emulsions with water as the paint vehicle. A truly water soluble resin suitable for the formation of an air-dry surface coating film and low viscosity solution has been discoverd; this water soluble resin is the reaction product of the organic solvent soluble resin and a hereinafter defined amine or ammonia.

The air-dry properties of the resins of the invention are to be understood as indicating that when a surface coating film—for example, 1 mil thick—is formed from organic solvent solution or water solution or water emulsion, the film will harden and form a solid structure such as afforded by present air-dry paints. The time needed to form a tack-free film will vary with the particular resin, the temperature to which the film is exposed, and the presence or absence of driers. The presence of cobalt driers such as normally utilized in the paint industry permits the formation of hard tack-free films in periods of time permitting use on exterior and interior surfaces.

*Resin*

The organic solvent soluble resin of the invention consists essentially of the polycondensation reaction product of a benzene tricarboxylic acid capable of forming an anhydride, polyalkylene glyco monoalkyl ether, a monoglyceride type product of a polyunsaturated fatty acid and glycerol or an erythritol, or an alcoholysis product of drying fatty oils with glycerol or an erythritol which alcoholysis product corresponds on the average to a monoglyceride type compound and a phthalic acid or phthalic anhydride. Also, the resin can be prepared by utilizing a polyunsaturated fatty alcohol in addition to the monoglyceride or alcoholysis product.

The benzene tricarboxylic acid reactant is capable of forming an anhydride. The tricarboxylic acid present in the polycondensation zone may be trimellitic acid, trimellitic anhydride, hemimellitic acid and/or hemimellitics anhydride.

The tricarboxylic acid is reacted with polyalkylene glycol monoalkyl ether. This ether contains from 2 to 8 ether groups; each alkylene unit present in the ether contains from 2 to 3 carbon atoms, i.e., the alkylene units are either ethylene or propylene; the alkyl group present in the ether contains from 1 to 8 carbon atoms. Numerous species of the defined ethers are available commercially under the "Carbitol" trade name. The Carbitols are alkylation reaction products of ether glycols and alkanols. Illustrative ether glycols are diethylene glycol, triethylene glycol, tetraethylene glycol, and polyethylene glycos containing not more than 8 ether linkages; dipropylene glycol, tripropylene glycol, and polypropylene glycols containing not more than 8 ether linkages. Illustrative alkanols are methanol, ethanol, isopropanol, n-butanol, t-butyl alcohol, and octanol. The mixtures of isomeric alkanols prepared by the Oxo process are particularly suitable, especially isooctyl alcohol. To illustrate the nomenclature utilized herein: The alkylation product of diethylene glycol with ethanol is known as diethylene glycol monoethyl ether, or 2-(2-ethoxyethoxy)ethanol, or ethylcarbitol.

The ester of the defined tricarboxylic acid and the defined ether (not hereinafter defined fatty alcohol) is condensed in a polyesterification condensation reaction with a material affording two hydroxyl groups per molecule and a phthalic acid or phthalic anhydride. This hydroxyl group affording material may provide two hydroxyl groups per molecule only as an average of the molecules in the material. When this material is an alcoholysis product, there may be on the average somewhat more than two hydroxyl groups per molecule. This material in effect functions as a dihydric alcohol.

The dihydroxyl group affording material may be an ester of a polyethenoid fatty acid containing at least about 10 carbon atoms and a polyhydric paraffinic alcohol (alkane polyol) containing 3–4 hydroxyl groups. The polyhydric alcohols include glycerol, erythritol, pentaerythritol, threitol, dipentaerythritol, and trimethylol propane. The polyethenoid fatty acid contains at least two olefinic bonds and contains at least about 10 carbon atoms. The fatty acids containing 16–24 carbon atoms are particularly suitable. Illustrative fatty acids are: linoleic, hiragonic, eleostearic, moroctic, arachidonic, clupanodonic, and nisinic. Economical and preferred sources of acids are the natural mixtures of acids obtained from drying fatty oils such as linseed oil, soya oil, tung oil, etc.

When the defined polyol is glycerol, the ester charged to the reaction zone is properly termed a monoglyceride of the particular fatty acid. For convenience, the terminology monoglyceride is utilized to describe this ester even when the polyol utilized in the formation of the ester is some other three or four hydroxyl group containing polyol.

Instead of more or less pure monoglyceride, the dihydroxyl group affording material may be the alcoholysis product of the hereinabove defined polyol and a drying fatty oil. When the polyol used in the alcoholysis reaction is glycerol, then the alcoholysis product will include the monoglyceride of the polyethenoid fatty acids contained in the drying oil and also of the other fatty acids contained in the drying oil and also the non-reactive materials. When the reacting polyol is other than glycerol, the alcoholysis product will include a mixture of true glycerides and glyceride type esters of the various acids and the reacting polyol. Sufficient reacting polyol is utilized in the alcoholysis reaction to have in the alcoholysis product compounds affording on the average two hydroxyl groups per molecule.

Any of the drying oils containing polyethenoid fatty acid esters, whether of vegetable or marine life origin, may be utilized. Illustrative of these drying oils are: linseed, soybean, tung, castor, dehydrated castor, oiticica, perilla, safflower, menhaden, and sardine.

When special properties are desired, the dihydroxyl group affording material may be a mixture of one or more of the various monoglycerides or a mixture of monoglyceride with an alcoholysis product or a mixture of alcoholysis product from two or more fatty oils, etc.

Particularly suitable air-drying resins are obtained when utilizing monoglycerides of linseed oil fatty acids, the alcoholysis product of linseed oil fatty acids with either glycerol or pentaerythritol, the monoglycerides of tung oil fatty acids and the alcoholysis product of tung oil with pentaerythritol.

The condensation zone also includes a phthalic acid or a phthalic anhydride dicarboxylic acid reactant. This may be one of the unsubstituted acids, i.e., phthalic acid, phthalic anhydride, isophthalic acid and terephthalic acid. Or alkyl substituted acid where the alkyl contains 1–8 carbon atoms, such as t-butylisophthalic acid, isooctylphthalic acid, dimethylterephthalic acid, methylphthalic anhydride. Or a holo substituted acid, such as, chlorophthalic acid, dichloroterephthalic acid, bromophthalic anhydride, and iodoisophthalic acid.

An air-dry resin can be obtained by reacting the ester product of the defined tricarboxylic acid and defined ether with a polyethenoid fatty alcohol containing at least 6 carbon atoms, or an ester product of simultaneously reacting the tricarboxylic acid, the ether, and the fatty alcohol with the hereinabove defined dihydroxyl group affording materials. The polyethenoid fatty alcohol contains at least two olefinic bonds and at least 6 carbon atoms. The fatty alcohols containing from 16 to 24 carbon atoms are particularly suitable. In addition to pure fatty alcohols, the fatty alcohols derived by the controlled hydrogenolysis of drying fatty oils may be used and, indeed, are the preferred source of fatty alcohol.

The ester product containing the fatty alcohol is then condensed with the hereinabove defined dihydroxyl group affording materials in the same manner and in the same ratios as when no fatty alcohol was used.

The polycondensation product resin is a material characterized by an acid number of about 15–60 (acid number is the mg. KOH per gram of resin). Also, this resin is characterized by air-drying properties when exposed to the atmosphere at ordinary temperatures in the form of a surface coating film.

In order to give utmost clarity, the relative amounts of each reactant charged to the resin preparation are set out hereinafter as the molar amount charged when the sum of the molar amount of tricarboxylic acid charged and of molar amount of the dicarboxylic acid charged is one (1). The tricarboxylic acid is charged in an amount of from at least about 0.3 to about 0.8 mole. The dicarboxylic acid is charged in an amount from about 0.2 to about 0.7 mole. And the sum of the two acids equals 1 (one) mole.

The defined ether is charged in an amount of from at least about 0.3 to about 0.5; but in not more than the amount of tricarboxylic acid charged. To illustrate: When the tricarboxylic acid charged is 0.4 mole, the ether charge amount may be from at least about 0.3 to 0.4 mole. When the tricarboxylic acid charged is 0.65 mole, the ether charge amount may be from at least about 0.3 to about 0.5 mole.

No fatty alcohol need be charged. The amount of fatty alcohol charged may be from "none," i.e., "zero," to about 0.5 mole. When the tricarboxylic acid amount is at 0.3 mole, "no" fatty alcohol is charged to the reaction zone. As the tricarboxylic amount is increased above 0.3 mole, the fatty alcohol amount which may be charged increases up to a maximum of about 0.5 mole at the maximum tricarboxylic acid usage of 0.8 mole; but the sum of the amount of ether charged and the amount of fatty alcohol charged may not exceed the amount of tricarboxylic acid charged. To illustrate:

| Illustration | Tricarboxylic Charged | Ether Charged | Maximum Alcohol Chargeable |
| --- | --- | --- | --- |
| (a) | 0.3 | 0.3 | Zero |
| (b) | 0.4 | 0.35 | 0.05 |
| (c) | 0.65 | 0.5 | 0.15 |
| (d) | 0.8 | 0.4 | 0.4 |
| (e) | 0.8 | 0.5 | 0.3 |
| (f) | 0.8 | 0.3 | 0.5 |

The two hydroxyl group affording material is charged in an amount sufficient to provide an excess of hydroxyl groups over free-carboxyl groups present. The amount is from about 1.0 to about 1.25 mole of material plus an additional amount equal to the sum of mole of tricarboxylic acid charged, minus the mole of ether and the mole of fatty alcohol charged. To illustrate with a basic amount of 1.10 mole.

| | Tricarboxylic | Ether | Alcohol | Dihydroxyl |
| --- | --- | --- | --- | --- |
| (1) | 0.3 | 0.3 | Zero | 1.1 |
| (2) | 0.65 | 0.5 | 0.10 | 1.15 |
| (3) | 0.5 | 0.3 | 0.10 | 1.2 |
| (4) | 0.8 | 0.4 | 0.2 | 1.3 |

Especially good results are obtained when said reactants are charged to the condensation zone in about the following proportions, set out on the basis of one mole of sum of the tricarboxylic acid and the dicarboxylic acid charged: tricarboxylic acid, 0.5–0.6 mole; dicarboxylic acid, 0.4–0.5 mole; ether, 0.3–0.4 mole and where the amount of ether is not more than the amount of tricarboxylic acid charged; fatty alcohol, "zero"–0.4 mole, where the amount of fatty alcohol may be increased up to 0.4 mole as the tricarboxylic acid is increased up to 0.6 mole, and where the sum of the ether and fatty alcohol charged is not more than the amount of tricarboxylic acid charged; two hydroxyl group-affording material, 1.10 mole, plus the sum of 1 mole for each mole of tricarboxylic acid charged, minus 1 mole for each mole of ether and fatty alcohol charged.

The ester preparation reaction is carried out by intermingling the tricarboxylic acid member and the ether (and the fatty alcohol) at a temperature on the order of 80°–130° C. until all of the acid has passed into solution, i.e., reacted. When the fatty alcohol ester is desired, the tricarboxylic acid and the ether may be reacted under these temperature conditions and then the fatty alcohol added and the reaction continued until the alcohol has passed into solution, i.e., reacted. The reaction is carried out utilizing a reflux system permitting trapping out of the water formed in the reaction.

The polycondensation reaction is carried out in the usual manner. The reaction herein has usually been carried out in a vessel provided with a condensing system permitting trapping out of water of reaction. The reactants are agitated at a temperature of about 160° C. to about 200° C., more usually about 180° C. The reaction is continued until the desired acid number is reached or to the point where the viscosity increase of the contents of the reaction zone indicate that the gelation point is being approached.

The resin, which is a translucent material of color ranging from clear to tan dependent upon the reactants, is controlled to an acid number from about 15 to about 60. This resin is extremely soluble in the hydrocarbon solvents and oxygenated organic solvents commonly used in the surface coating field. The better known of these solvents are methyl alcohol, ethyl alcohol, butyl alcohol, acetone, methylethyl ketone, cellosolve, benzene, toluene, xylene, and also in mixed solvents such as 60:40 volume ratio of xylenes and butyl alcohol. Also, the resin is distinguished by its property of forming relatively stable dispersions (emulsions) in water; these emulsions may readily be formed by agitating the resin and water at a moderately elevated temperature such as 150° F. (65° C.).

The resin may be utilized in its organic solvent solution or water emulsion to form air-dry surface coatings. Preferably, the solutions contain a cobalt and/or lead drier to speed up the drying reaction. The various cobalt and lead driers in the paint industry are suitable for this purpose. In addition, the solutions may contain pigments such as titanium dioxide and color imparting bodies permitting the lay down of a film of the paint type.

Even though the solvent soluble resin and water emulsion forms are particularly useful in the surface coating field, it is preferred that the resin be converted to a water soluble form permitting the use of water as the vehicle for a true water solvent, (vehicle) surface coating affording composition.

Water Soluble Resin

The water soluble resin consists of the resin produced by the reaction of the polycondensation reaction and an alkaline reacting agent. The resin and the agent are reacted until a water soluble resin is obtained. Usually enough agent is used to neutralize the acidity of the resin; less may be used. The amount of alkaline reacting material is most readily determined by following the pH of the aqueous medium. The resin passes into solution substantially completely at a pH of about 5. In practically all instances, the resin will be in a complete solution at a pH of about 6. The use of alkaline agent in excess of that needed to bring all the polyester product into solution is not harmful, at least up to a water solution pH of about 8. It is preferred to have the aqueous solution somewhat on the acid side or neutral, i.e., a pH of from 6 to 7.

The alkaline reacting agent may be ammonia or alkylamine, or heteroamine or an alkanolamine. Ammonium hydroxide as the aqueous solution containing 20-28% is suitable. The alkyl amines, particularly the lower molecular weight containing not more than 4 carbon atoms in each alkyl group, are suitable. The alkanolamines, such as 2-amino-2-methyl-1-propanol ethanolamine and dimethylethanolamine, are especially suitable. The heteroamines, such as morpholine, pyridine, and piperdine may be used. The type of alkaline reacting material used is determined in part by the characteristics desired in the final water soluble resin; also, by the type of resin product which is to be converted to a water soluble form.

The neutralization reaction is carried out by contacting the resin and the aqueous alkaline reacting medium. It is preferred that it be warm, i.e., maintained in the region of 100-160° F. The two are agitated until the resin has passed into solution. The water solutions of the water soluble resin are clear liquids usually containing some opalescent appearance; the solutions may be colorless or colored, depending on the particular water soluble resin present.

The water soluble resin behaves in essentially the same manner as the resin when exposed to oxygen or air in that an air-dry solid is formed. These water soluble resins produce solutions containing as much or more than 50 percent by weight of the resin. (The water soluble resins are also soluble in the ordinary oxygenated organic solvents, as well as in mixtures of these solvents with benzene hydrocarbons.)

When a paint composition is to be formed, the resin, the alkaline agent, the water vehicle and pigments may be intermingled simultaneously to obtain the water solvent system in one operation.

A resin, either organic solvent soluble or water soluble, of improved air-dry properties is obtained by heating the resin with a cobalt salt of a fatty acid. For convenience, it is customary to heat an organic solvent soluble resin with the cobalt salt at a temperature on the order of 130°–220° C. The resin and the cobalt salt are held at this temperature for time such that the air-dry properties of a film formed from the resin is improved relative to the resin which has not been cobalt treated. The times will vary with the particular cobalt salt, the particular resin, and the temperature of reaction of the two. The minimum times may vary from 5 minutes to as much as 60 minutes.

The cobalt may be reacted with any of the fatty acids; the hydrate forms may be used. Cobaltous acetate and cobaltous acetate tetrahydrate are preferred cobalt salts. The amount of cobalt salt utilized will depend upon the particular resin and the air-dry characteristics desired in the final treated resin. In general, the salt is charged to the reaction zone in an amount of 0.05–0.5 weight percent, calculated as cobalt metal, and based on the resin charged.

Illustrations

Typical resins of the invention are set out hereinbelow. Also, paint compositions prepared from these resins using water as the vehicle have been prepared and the air-dry property of films produced therefrom are set out.

Resin I 48.01 grams of trimellitic anhydride (0.25 mole) and 40.50 grams of butyl carbitol (0.25 mole) were heated and stirred together under nitrogen in the usual apparatus for this type of esterification for 90 minutes at 100–108° C. 195.5 grams of linseed monoglycerides (0.55 mole) were added followed five minutes later by 37.10 grams of phthalic anhydride (0.25 mole) when the charge had reached 130° C. At this point the charge was clear. The temperature was raised to 170° C. in an additional 10 minutes and held at 170–175° C. for an additional 2½ hours. The resulting product had an acid number of 44.1.

A portion of this resin was converted into a paint as follows: 30.0 grams of resin, 88 ml. of distilled water and 2.20 grams of 2-amino-2-methyl-1-propanol were stirred together at 50–60° C. for about 10 minutes until an opalescent solution, reminescent of dilute soap solutions, was obtained. 33.0 grams of titanium dioxide were then added followed by 2.50 grams of cobalt drier solution containing 6% cobalt. Both the opalescent solution and the pigmented product were very fluid. This paint airdried overnight when applied to wood to give a tough coating. The product was tack-free after about 4½ hours when applied to glass.

Resin II (No Phthalic Anhydride)

192.06 grams trimellitic anhydride (1.0 mole), 81.0 grams butyl carbitol (0.50 mole) and 133.7 grams linseed fatty alcohols (0.50 mole) were heated together under nitrogen for 90 minutes at 100–122° C. 390 grams of linseed monoglycerides (1.10 moles) were added and the charge was heated to 170° C. in 10 minutes and held at 170–181° C. for 4¼ hours. Acid number of product=46.6.

A paint was prepared from a sample of this resin as follows: 30.0 grams of resin were dissolved as before in 88 ml. of distilled water containing 2.22 grams of 2-amino-2-methyl-1-propanol. Again an opalescent solution resulted but it was much thicker than with the product of Resin I. 33.0 grams of titanium dioxide pigment were stirred in followed by 2.50 grams of drier containing 6% cobalt. To obtain suitable finishing properties an additional 10 ml. of water had to be added to thin this product.

The decreased viscosity described in Resin I offers an advantage in that it permits a higher concentration of vehicle to be incorporated in the paint.

*Resin IIa*

Modified resins of the type described in Resin II where 1.60 mole of linseed monoglyceride were used in place of the 1.10 moles of linseed monoglycerides and 0.50 mole linseed fatty alcohols also gave much more viscous solutions than those of Resin I.

*Resin III*

A resin of acid number 53.4 was prepared by reacting 153.9 grams of trimellitic anhydride (0.80 mole), 64.9 grams butyl carbitol (0.40 mole), and 106.5 grams linseed fatty alcohols (0.40 mole) in the manner previously described. Then 29.7 grams phthalic anhydride (0.20 mole) and 390.0 grams linseed monoglycerides (1.10 moles) were added and the mixture cooked at 170–180° C. for 11 hours. The resulting product was soluble in adqueous amine and gave paints which dried to hard, tough films from either aqueous or mineral spirits solution. This resin had a definite improvement in drying properties over that of I and II above.

The viscosity of the solutions and points of Resin III was very much lower than that of Resin II or IIa and similar to that of Resin I. The films from Resin I and III were harder than those from Resin II.

Thus having described the invention, what is claimed is:

1. A resin having air-dry properties when formed into a surface coating film, which resin consists essentially of the polycondensation reaction product of (A) (I) a tricarboxylic acid selected from the class consisting of trimellitic acid, trimellitic anhydride, hemimellitic acid and hemimellitic anhydride, (II) a polyalkylene glycol monoalkyl ether containing from 2 to 8 ether groups, each alkylene unit containing from 2 to 3 carbon atoms and the alkyl group containing from 1 to 8 carbon atoms, and (III) a polyethenoid fatty alcohol containing at least 6 carbon atoms, with (B) (I) a material affording on the average of about two hydroxyl groups per molecule which material is selected from the group consisting of (a) the hydroxyl group containing ester of a polyethenoid fatty acid containing at least about 10 carbon atoms and a polyhydric paraffinic alcohol containing 3–4 hydroxyl groups, (b) the alcoholysis product of a drying fatty oil and a polyhydric paraffinc alcohol containing 3–4 hydroxyl groups and (c) mixtures thereof, and (II) a dicarboxylic acid selected from the class consisting of phthalic acids and phthalic anhydrides, which resin is characterized by an acid number of about 15–60 and air-drying properties when exposed to the atmosphere at ordinary temperatures in the form of a surface coating film and wherein said reactants are charged to the condensation zone in about the following proportions, set out on the basis of one mole of sum of the tricarboxylic acid and the dicarboxylic acid charged: tricarboxylic acid, 0.3–0.8 mole; dicarboxylic acid, 0.2–0.7 mole; ether, 0.3–0.5 mole and where the amount of ether is not more than the amount of tricarboxylic acid charged; fatty alcohol, "zero"–0.5 mole, where the "zero" amount of fatty alcohol corresponds to the 0.3 mole lower limit of tricarboxylic acid amount, and the amount of fatty alcohol may be increased to 0.5 mole as the tricarboxylic acid is increased to 0.8 mole, and where the sum of the ether and fatty alcohol charged is not more than the amount of tricarboxylic acid charged; two hydroxyl group-affording material, 1.0–1.25 moles, plus the sum of 1 mole for each mole of tricarboxylic acid charged, minus 1 mole for each mole of ether and fatty alcohol charged.

2. The resin of claim 1 wherein said tricarboxylic acid is trimellitic anhydride.

3. The resin of claim 1 wherein said ether is diethylene glycol monobutyl ether.

4. The resin of claim 1 wherein said material is the monoglyceride of linseed fatty acids.

5. The resin of claim 1 wherein said material is the alcoholysis product of linseed oil and pentaerythritol.

6. The resin of claim 1 wherein said fatty alcohol is linseed fatty alcohol.

7. The resin of claim 1 wherein said dicarboxylic acid is phthalic anhydride.

8. A resin having air-dry properties when formed into a surface coating film, which resin consists essentially of the polycondensation reaction product of (A) (I) a tricarboxylic acid selected from the class consisting of trimellitic acid, trimellitic anhydride, hemimellitic acid and hemimellitic anhydride, (II) a polyalkylene glycol monoalkyl ether containing from 2 to 8 ether groups, each alkylene unit containing from 2 to 3 carbon atoms and the alkyl group containing from 1 to 8 carbon atoms, and (III) a polyethenoid fatty alcohol containing at least 6 carbon atoms, with (B) (I) a material affording on the average of about two hydroxyl groups per molecule which material is selected from the group consisting of (a) the hydroxyl group containing ester of a polyethenoid fatty acid containing at least about 10 carbon atoms and a polyhydric paraffinic alcohol containing 3–4 hydroxyl groups, (b) the alcoholysis product of a drying fatty oil and a polyhydric paraffinic alcohol containing 3–4 hydroxyl groups and (c) mixtures thereof, and (II) a dicarboxylic acid selected from the class consisting of phthalic acids and phthalic anhydrides, which resin is characterized by an acid number of about 15–60 and air-drying properties when exposed to the atmosphere at ordinary temperatures in the form of a surface coating film and wherein said reactants are charged to the condensation zone in about the following proportions, set out on the basis of one mole of sum of the tricarboxylic acid and the dicarboxylic acid charged: tricarboxylic acid, 0.3–0.8 mole; dicarboxylic acid, 0.2–0.7 mole; ether, 0.3–0.5 mole and where the amount of ether is not more than the amount of tricarboxylic acid charged; fatty alcohol, "zero"–0.5 mole, where the "zero" amount of fatty alcohol corresponds to the 0.3 mole lower limit of tricarboxylic acid amount, and the amount of fatty alcohol may be increased to 0.5 mole as the tricarboxylic acid is increased to 0.8 mole, and where the sum of the ether and fatty alcohol charged is not more than the amount of tricarboxylic acid charged; two hydroxyl group-affording material, 1.0–1.25 moles, plus the sum of 1 mole for each mole of tricarboxylic acid charged, minus 1 mole for each mole of ether and fatty alcohol charged reacted with (B) an alkaline agent selected from the group consisting of ammonia, alkylamines, heteroamines and alkanolamines said water soluble resin having air-drying properties when exposed to the atmosphere at ordinary temperatures in the form of a surface coating film.

9. The resin of claim 8 wherein said acidic member is trimellitic anhydride.

10. The resin of claim 8 wherein said ether is diethylene glycol monobutyl ether.

11. The resin of claim 8 wherein said material is the monoglyceride of linseed oil fatty acids.

12. The resin of claim 8 wherein said reactants are charged to the condensation zone in about the following proportions, set out on the basis of one mole of sum of the tricarboxylic acid and the dicarboxylic acid charged: tricarboxylic acid, 0.5–0.6 mole; dicarboxylic acid, 0.4–0.5 mole; ether 0.3–0.4 mole and where the amount of ether is not more than the amount of tricarboxylic acid charged; fatty alcohol, "zero"–0.4 mole, where the amount of fatty alcohol may be increased up to 0.4 mole as the tricarboxylic acid is increased up to 0.6 mole, and where the sum of the ether and fatty alcohol charged is not more than the amount of tricarboxylic acid charged; two hydroxyl group-affording material, 1.10 moles, plus the sum of 1 mole for each mole of tricarboxylic acid charged, minus 1 mole for each mole of ether and fatty alcohol charged.

References Cited in the file of this patent

UNITED STATES PATENTS

| | | |
|---|---|---|
| 2,048,778 | Brubaker et al. | July 28, 1936 |
| 2,870,102 | Van Strien | Jan. 20, 1959 |
| 2,939,857 | Bolton et al. | June 7, 1960 |
| 2,960,485 | Bolton et al. | Nov. 15, 1960 |